United States Patent
Karunakaran et al.

(10) Patent No.: US 12,522,215 B2
(45) Date of Patent: Jan. 13, 2026

(54) LANE CHANGE PATH GENERATION USING PIECEWISE CLOTHOID SEGMENTS

(71) Applicant: TORC Robotics, Inc., Blacksburg, VA (US)

(72) Inventors: Harish Karunakaran, Blacksburg, VA (US); Joseph Adkisson, Blacksburg, VA (US); Pradeep Illayaperumal Selvaraju, Blacksburg, VA (US)

(73) Assignee: TORC Robotics, Inc., Blacksburg, VA (US)

( * ) Notice: Subject to any disclaimer, the term of this patent is extended or adjusted under 35 U.S.C. 154(b) by 314 days.

(21) Appl. No.: 18/194,212

(22) Filed: Mar. 31, 2023

(65) Prior Publication Data
US 2024/0326816 A1 Oct. 3, 2024

(51) Int. Cl.
*B60W 30/18* (2012.01)
*B60W 60/00* (2020.01)

(52) U.S. Cl.
CPC .... *B60W 30/18163* (2013.01); *B60W 60/001* (2020.02); *B60W 2520/06* (2013.01)

(58) Field of Classification Search
CPC ......... B60W 30/18163; B60W 60/001; B60W 2520/06; G05D 1/00; G08G 1/00; G01C 21/00
See application file for complete search history.

(56) References Cited

U.S. PATENT DOCUMENTS 5,375,059 A * 12/1994 Kyrtsos ................... G01S 19/11
701/470
5,636,338 A * 6/1997 Moreton ................. G06T 17/30
345/442

(Continued)

FOREIGN PATENT DOCUMENTS

KR 102184176 B1 * 11/2020 ............ B60W 40/06

OTHER PUBLICATIONS

KR-102184176-B1 machine translation (Year: 2020).*
(Continued)

*Primary Examiner* — Angelina M Shudy
(74) *Attorney, Agent, or Firm* — Armstrong Teasdale LLP

(57) ABSTRACT

Embodiments disclosed herein include systems and methods for generating proposed driving paths for an automated vehicle performing a lane-change. An autonomy system continually generates reference trajectories. The autonomy system then iteratively and recursively generates clothoid points tracing the reference trajectory, by the computer, but constrained by clothoid thresholds. The clothoid points define a clothoid representing a revised trajectory, effectively constrained by the clothoid thresholds. The autonomy system generates and updates driving instructions for the automated vehicle to follow a drive path represented by the clothoid. If the autonomy system determines clothoid points cannot be generated according to the thresholds, then the autonomy system determines the automated vehicle cannot safely or practicably perform the lane change maneuver for the given portion of road. As the autonomy system may continually generate the reference trajectories, the autonomy system may proceed to analyzing a next reference trajectory to perform the lane change maneuver.

20 Claims, 5 Drawing Sheets

(56) References Cited

U.S. PATENT DOCUMENTS

| | | | | |
|---|---|---|---|---|
| 6,169,940 | B1* | 1/2001 | Jitsukata | G05D 1/0257 701/23 |
| 7,805,442 | B1* | 9/2010 | Joshi | G08G 1/096827 707/921 |
| 9,120,485 | B1* | 9/2015 | Dolgov | B62D 15/025 |
| 10,671,075 | B1* | 6/2020 | Kobilarov | G05D 1/0088 |
| 11,260,849 | B2* | 3/2022 | Zhu | G05D 1/0255 |
| 2008/0198162 | A1* | 8/2008 | Ni | G01C 21/3673 345/442 |
| 2008/0208454 | A1* | 8/2008 | Pesterev | G01C 21/26 701/467 |
| 2008/0255728 | A1* | 10/2008 | Ottenhues | B62D 15/0285 701/1 |
| 2009/0018767 | A1* | 1/2009 | Gehring | B60W 40/072 701/533 |
| 2009/0132139 | A1* | 5/2009 | Takeuchi | B60W 30/18009 701/70 |
| 2010/0217522 | A1* | 8/2010 | Ando | G01S 19/49 701/532 |
| 2010/0286872 | A1* | 11/2010 | Endo | B62D 15/027 701/41 |
| 2011/0178689 | A1* | 7/2011 | Yasui | B60K 31/12 701/70 |
| 2012/0121206 | A1* | 5/2012 | Witmer | G06F 16/29 382/291 |
| 2012/0277993 | A1* | 11/2012 | Mund | G01C 21/3841 701/450 |
| 2013/0006473 | A1* | 1/2013 | Buerkle | B62D 15/025 701/41 |
| 2015/0317585 | A1* | 11/2015 | Panchal | G06F 17/10 705/7.23 |
| 2015/0336587 | A1* | 11/2015 | Inoue | B60W 10/184 701/1 |
| 2017/0059716 | A1* | 3/2017 | Choi | G01S 19/42 |
| 2017/0089707 | A1* | 3/2017 | Jehlicka | G01C 21/3819 |
| 2017/0236422 | A1* | 8/2017 | Naka | G08G 1/165 701/301 |
| 2017/0277195 | A1* | 9/2017 | Frazzoli | B60W 60/00276 |
| 2018/0059682 | A1* | 3/2018 | Thode | B60W 30/095 |
| 2018/0099667 | A1* | 4/2018 | Abe | B60W 30/0956 |
| 2018/0170370 | A1* | 6/2018 | Kataoka | B60W 30/09 |
| 2018/0273028 | A1* | 9/2018 | Kato | B60W 30/06 |
| 2018/0284769 | A1* | 10/2018 | Wang | G05D 1/0248 |
| 2018/0359908 | A1* | 12/2018 | Kelley | G05D 1/0274 |
| 2019/0009783 | A1* | 1/2019 | Kawasaki | G01C 21/3655 |
| 2019/0041858 | A1* | 2/2019 | Bortoff | B60W 10/20 |
| 2020/0385017 | A1* | 12/2020 | Baba | G06V 20/58 |
| 2021/0003410 | A1* | 1/2021 | Takeuchi | B60W 30/18163 |
| 2021/0031800 | A1* | 2/2021 | Fuchs | G08G 1/167 |
| 2021/0109529 | A1* | 4/2021 | Tsusaka | G05D 1/0248 |
| 2021/0146922 | A1* | 5/2021 | Fuchs | G08G 1/096725 |
| 2021/0188308 | A1* | 6/2021 | Zhu | G05D 1/0212 |
| 2021/0271245 | A1* | 9/2021 | Bradley | G05D 1/227 |
| 2021/0370916 | A1* | 12/2021 | Ishinoda | B60W 30/06 |
| 2021/0373566 | A1* | 12/2021 | Agarwal | B60W 30/18145 |
| 2022/0055658 | A1* | 2/2022 | Yang | G06V 20/58 |
| 2022/0083065 | A1* | 3/2022 | Liu | B60W 60/001 |
| 2022/0215603 | A1* | 7/2022 | Goldman | B60W 30/18009 |
| 2022/0315037 | A1* | 10/2022 | Wankhede | B60W 60/0013 |
| 2022/0402523 | A1* | 12/2022 | Ljungqvist | B60W 30/10 |
| 2023/0030368 | A1* | 2/2023 | Uno | B60W 10/11 |
| 2023/0052594 | A1* | 2/2023 | Lengsfeld | G01C 21/28 |
| 2023/0234608 | A1* | 7/2023 | Tomioka | B60W 30/0956 |
| 2023/0242118 | A1* | 8/2023 | Orosz | B60W 10/04 701/24 |
| 2024/0034311 | A1* | 2/2024 | Bruno | B60W 30/09 |
| 2024/0227793 | A1* | 7/2024 | Gao | G08G 1/167 |
| 2025/0002006 | A1* | 1/2025 | Ogawa | G08G 1/143 |
| 2025/0033662 | A1* | 1/2025 | Krüger | G01C 21/3407 |
| 2025/0058798 | A1* | 2/2025 | Iba | B60W 30/09 |
| 2025/0102320 | A1* | 3/2025 | Zeng | G01C 21/3867 |
| 2025/0229776 | A1* | 7/2025 | Raikar | B60W 30/12 |

OTHER PUBLICATIONS

Kotha, Bhavi Bharat. "Autonomous Vehicle Waypoint Navigation Using Hyper-Clothoids." (2022). (Year: 2022).*

Shaju A, Southward S, Ahmadian M. Enhancing Autonomous Vehicle Navigation with a Clothoid-Based Lateral Controller. Applied Sciences. 2024; 14(5):1817. (Year: 2024).*

Hunde, Sena Aschalew. Cooperative Clothoidal-Estimation Based Lane Detection for Vehicle Platooning. Diss. Virginia Tech, 2021. (Year: 2021).*

Kahya, Ardam Haseeb Mohammed Ali, and Klaus Werner Schmidt. "Clothoid-based lane change trajectory computation for self-driving vehicles." Cankaya University Journal of Science and Engineering 14.2 (2017). (Year: 2017).*

Lima, Pedro F. Optimization-based motion planning and model predictive control for autonomous driving: With experimental evaluation on a heavy-duty construction truck. Diss. KTH Royal Institute of Technology, 2018. (Year: 2018).*

Goswani, "Trajectory generation for lane-change maneuver of autonomous vehicles", Purdue University, May 2015, pp. 1-147.

Chee et al., "Vehicle Lane Change Maneuver in Automated Highway Systems", California Partners for Advanced Transit and Highways, Oct. 1994, pp. 1-30.

Wilde, "Computing Clothoid Segments for Trajectory Generation", IEEE/RSJ International Conference on Intelligent Robotics and Systems, Oct. 2009, pp. 2440-2445.

* cited by examiner

LANE CHANGE PATH GENERATION USING PIECEWISE CLOTHOID SEGMENTS

TECHNICAL FIELD

This application generally relates to generating trajectories for automated vehicles performing lane change maneuvers.

BACKGROUND

A conventional approach to generating a lane-change path by automated vehicles includes a path-generation algorithm that outputs B-splines representing proposed paths. One major problem with this approach is failure to account for the automated vehicle's later acceleration, leading to the loss of control of the automated vehicle's lateral acceleration during the lane-change maneuver. Failing to account for and control the lateral acceleration causes the automated vehicle to generate paths with curvature and steering outputs that are not safely, or even realistically, achievable by the automated vehicle.

Another problem with the current B-spline approach is the curvature discontinuity of the generated path. This may also output paths with curvature and steering outputs that are not safely, or even realistically, achievable by the automated vehicle.

Another problem with this approach is the complex nature of the underlying representation for generating paths using the B-spline approach. This complexity present practical limitations on the ability to advance the lane-change path-generation functions for future use cases, such as low speed lane changes, lane change cancels, and stop-and-go lane changes.

SUMMARY

Embodiments disclosed herein include systems and methods of an improved process for generating proposed driving paths for an automated vehicle performing a lane-change maneuver. An autonomy control system of the automated vehicle continually generates proposed reference trajectories according to one or more spline functions. The autonomy system then generates a plurality of clothoid points according to certain constraints or thresholds. The clothoid threshold inhibit unwanted or hazardous driving actions by, for example, limiting trajectories that would produce hazardous amounts of lateral acceleration, later jerk, or otherwise produce an unwanted or unsafe driving behavior. The clothoid points define a clothoid representing a corrected or revised version of the reference trajectory, constrained by iteratively and recursively generating each clothoid point according to the clothoid thresholds. A lateral planner program or other software program of the autonomy system may generate and update driving instructions for the automated vehicle to follow the drive path represented by the clothoid. If, however, the autonomy system determines that the clothoid points cannot be generated within the thresholds, then the autonomy system determines that the automated vehicle cannot safely or practicably perform the lane change maneuver for the given portion of road. As the autonomy system may continually generate the reference trajectories, the autonomy system may proceed to analyzing a next reference trajectory to perform the lane change maneuver.

In an embodiment, a method may comprise generating, by a processor of an automated vehicle, a reference trajectory for the automated vehicle according to a target destination, the reference trajectory including a one or more reference headings and one or more curvatures; determining, by the processor, a clothoid for the reference trajectory based upon a curvature rate and a current curvature of the automated vehicle, the clothoid comprising a plurality of discrete clothoid points, each discrete clothoid point situated within a threshold distance from the reference trajectory; and generating, by the processor, a driving instruction for directing the automated vehicle based upon the discrete points of the clothoid.

The reference trajectory may be generated according to a quantic hermite spline algorithm.

Generating a driving instruction may include canceling, by the processor, a lane change maneuver associated with the reference trajectory; and generating, by the processor, a next reference trajectory according to a next target destination. The method may further comprise determining, by the processor, that a clothoid point exceeds the threshold distance from the reference trajectory, wherein the processor cancels the lane change maneuver when the clothoid point exceeds the threshold distance.

The processor may iteratively and recursively generate each clothoid point of the clothoid.

Each clothoid point may defined by a set of clothoid values, including a longitudinal position, a lateral position, a heading, and a curvature.

The processor may generate the set of clothoid values of each particular clothoid point according to reference values of corresponding points of the reference trajectory.

In another embodiment, a system may comprise a non-transitory computer-readable medium containing instructions that when executed by at least one processor associated with an automated vehicle are configured to: generate a reference trajectory for the automated vehicle according to a target destination, the reference trajectory including a one or more reference headings and one or more curvatures; determine a clothoid for the reference trajectory based upon a curvature rate and a current curvature of the automated vehicle, the clothoid comprising a plurality of discrete clothoid points, each discrete clothoid point situated within a threshold distance from the reference trajectory; and generate a driving instruction for directing the automated vehicle based upon the discrete points of the clothoid.

In yet another embodiment, a system may comprise a computer associated with an automated vehicle and comprising at least one processor configured to: generate a reference trajectory for the automated vehicle according to a target destination, the reference trajectory including a one or more reference headings and one or more curvatures; determine a clothoid for the reference trajectory based upon a curvature rate and a current curvature of the automated vehicle, the clothoid comprising a plurality of discrete clothoid points, each discrete clothoid point situated within a threshold distance from the reference trajectory; and generate a driving instruction for directing the automated vehicle based upon the discrete points of the clothoid.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views. The accompanying drawings, which are incorporated in and constitute a part of this specification, illustrate various exemplary embodiments and together with the description, serve to explain the principles of the disclosed embodiments.

DETAILED DESCRIPTION

Figure 1:
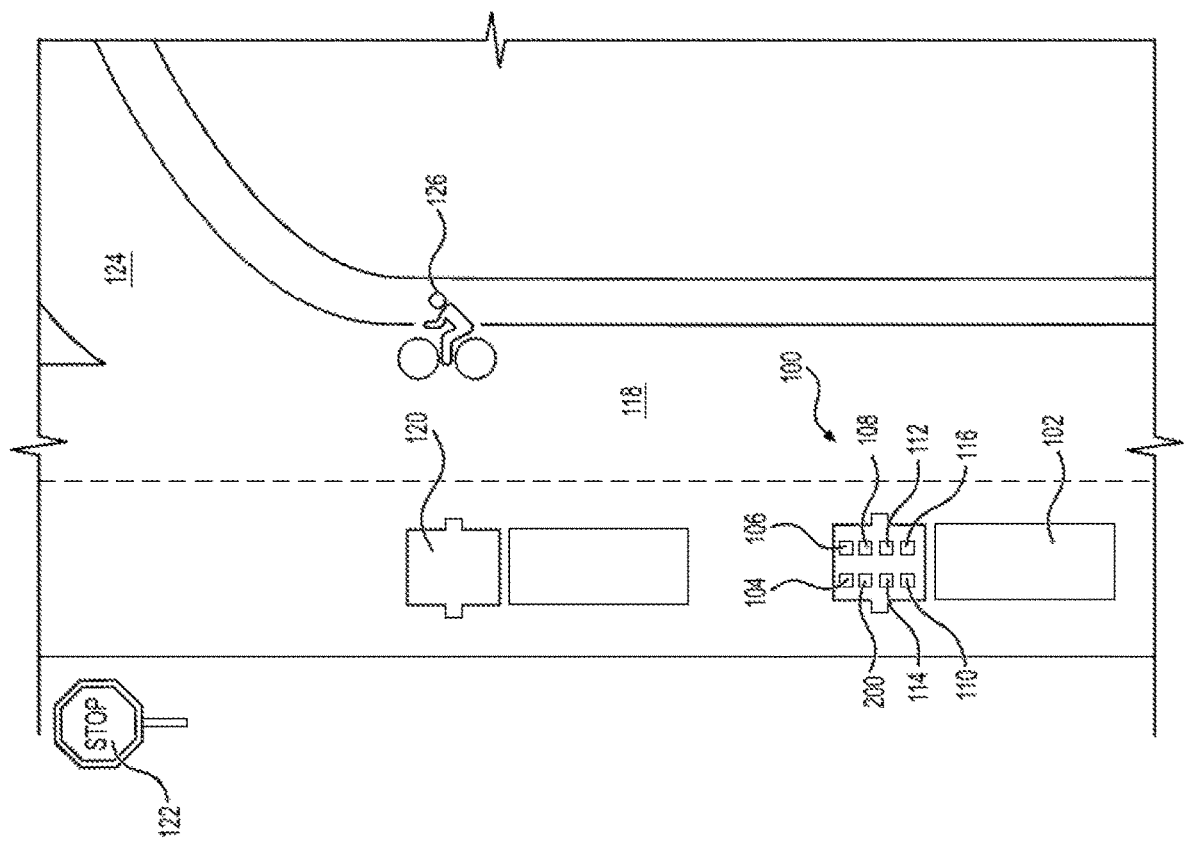
FIG. 1 illustrates a system for selecting a candidate trajectory on a vehicle, according to an embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Embodiments described herein relate to automated vehicles having computer-driven automated driver systems (sometimes referred to as "autonomy systems"). The automated vehicle may be completely autonomous (fully-autonomous), such as self-driving, driverless, or Level 4 autonomy, or semi-autonomous, such as Level 3 autonomy. As used herein the terms "autonomous vehicle" and "automated vehicle" includes both fully-autonomous and semi-automated vehicles. The present disclosure sometimes refers to automated vehicles as "ego vehicles." automated vehicles.

Generally, autonomy systems of automated vehicles are logically structured according to three pillars of technology: (1) perception; (2) maps/localization; and (3) behaviors, planning, and control.

The function of the perception aspect is to sense an environment surrounding the automated vehicle by gathering and interpreting sensor data. To interpret the surrounding environment, a perception module or engine in the autonomy system may identify and classify objects or groups of objects in the environment. For example, a perception module associated with various sensors (e.g., LiDAR, camera, radar, etc.) of the autonomy system may identify one or more objects (e.g., pedestrians, vehicles, debris, etc.) and features of a roadway (e.g., lane lines) around the automated vehicle, and classify the objects in the road distinctly.

The maps/localization aspect of the autonomy system determines where on a pre-established digital map the automated vehicle is currently located. One way to do this is to sense the environment surrounding the automated vehicle (e.g., via the perception system) and to correlate features of the sensed environment with details (e.g., digital representations of the features of the sensed environment) on the digital map. After the systems of the autonomy system have determined the location of the automated vehicle with respect to the digital map features (e.g., location on the roadway, upcoming intersections, road signs, etc.), the automated vehicle can plan and execute maneuvers and/or routes with respect to the features of the digital map.

The behaviors, planning, and control aspects of the autonomy system to make decisions about how automated vehicle should move through the environment to get to a calculated goal or destination. For instance, the behaviors, planning, and control components of the autonomy system consumes information from the perception engine and the maps/localization modules to know where the ego vehicle is relative to the surrounding environment and what other traffic actors are doing. The behaviors, planning, and control components may be responsible for decision-making to ensure, for example, the vehicle follows rules of the road and interacts with other aspects and features in the surrounding environment (e.g., other vehicles) in a manner that would be expected of, for example, a human driver. The behavior planning may achieve this using a number of tools including, for example, goal setting (local/global), implementation of one or more bounds, virtual obstacles, and using other tools.

The automated vehicle's behaviors planning and control components may be responsible for decision-making to ensure, for example, the vehicle follows rules of the road and interacts with other aspects and features in the surrounding environment (e.g., other vehicles) in a manner that would be expected of, for example, a human driver. The behavior planning may achieve this using a number of tools including, for example, goal setting (local/global), implementation of one or more bounds, virtual obstacles, and using other tools. Some planners may use, for example, sampling based planning in which a number of feasible trajectory paths may be generated and sampled, which may be verified through one or more processes, such as, for example, collision checking. Determining feasible trajectory paths can be should account for the geometry of the road, forces applied against the automated vehicle if performing a proposed trajectory, and dynamic objects (e.g., oncoming or parallel traffic, cyclists) in the environment. Automated driving functions may be implemented through the generation and selection of candidate motion trajectories. The behaviors and control system generates these trajectories, can be ultimately passed on for use by motion control. If the behaviors and control system determines the need to change lanes, then the behaviors and control system generates candidate trajectories resulting in a target location in an adjacent lane at some distance down the road.

Lane-change trajectories planned for the automated vehicle must be safe and dynamically feasible according to the geometry of the road and the resulting forces on the automated vehicle, such as lateral acceleration. An important requirement related to the trajectory is avoiding maneuvers resulting in dangerous amounts of force being applied to the automated vehicle. Factoring in dynamic feasibility further complicates the problem. Dynamic feasibility refers to the capability of the automated vehicle to complete a trajectory. For instance, planning a trajectory for 100 m/s may not be viable if the automated vehicle can only travel at a maximum speed of 29 m/s. As such, dynamic feasibility relate to safety when performing certain maneuvers, because dynamic feasibility pertains to the generation and attempted completion of implausible or impossible trajectories that may lead to hazardous situations.

Viable candidate trajectories for a lane-change maneuver can be generated and selected in a number of ways. Selection methods may use, for example, a distance bound (i.e., a maximum or minimum instantaneous distance from the automated vehicle over a preconfigured time) to calculate and select candidate trajectories. As an example, the automated vehicle may continuously generate lane-change trajectories according to a 7-second time bound, where the automated vehicle determines target destinations in the adjacent lane at a 7-second distance from the instantaneous location of the automated vehicle. Some candidate trajectories result in suboptimal paths, however, because the trajectories result in a hazardous amount of lateral acceleration. An optimal candidate trajectory can be selected that avoids dangerous amounts of lateral acceleration placed on the automated vehicle.

FIG. 1 illustrates a system 100 for selecting a candidate trajectory on a vehicle 102. The vehicle 102 may include various autonomous functionality (e.g., any autonomy level 1-5) and may include, for example, a virtual driver, an advanced driver assistance system (ADAS), and/or other autonomous and autonomous-capable systems or components. The vehicle 102 can be an ego vehicle. The ADAS system or other autonomous functions on the vehicle 102 may utilize data generated by the various sensing systems (e.g., camera, LiDAR, radar, etc.) and systems of the vehicle configured to communicate with external systems or networks (e.g., GNSS, mapping systems, etc.) on the vehicle to perform the one or more autonomous functions. The vehicle 102 depicted in FIG. 1 is a truck (i.e., a tractor trailer), but it is to be understood that the vehicle 102 could be any type of vehicle including a car, a mobile machine, etc. The vehicle 102 includes a autonomy system 200 that may be communicatively coupled to a camera system 104, a LiDAR system 106, a GNSS 108, an inertial measurement unit (IMU) 110, a transceiver 112, an object node 114, and a mapping node 116. In some embodiments, the object node 114 and the mapping node 116 may be components of or modules on the controller 200.

As depicted in FIG. 1, the vehicle 102 drives down a roadway 118 following a subject vehicle 120. The vehicle 102 and the subject vehicle 120 are approaching a ramp 124 that provides an exit from the roadway 118. Also utilizing the roadway 118 is a cyclist 126. The vehicle 102 is approaching a stop sign 122, which stop sign may serve as a "stop line" for the autonomous behavioral planning modules described in greater detail herein. As used herein, a stop line is a location at which the behavioral planning modules "know" the vehicle cannot pass without safely coming to a complete stop such that one or more of the behavioral planning modules will generate trajectories which stop the vehicle at the stop line.

Each of the features in the environment surrounding the vehicle 102 may be perceived or otherwise known to the vehicle 102 (e.g., based on a perception engine including one or more of the perceptive systems described herein) and may affect the behavior planning of the vehicle 102. For example, the cyclist 126 may be perceived by one or more sensors aboard the vehicle 102 (e.g., the camera system 104, the LiDAR system 106, etc.) and may be classified (e.g., by one or more modules in the controller 200) such that the vehicle's behavioral planning modules can develop one or more trajectories accounting for the presence of the cyclist 126 as described in greater detail herein.

Generally speaking, a trajectory is mathematical representation of a proposed motion for the ego vehicle to carry out via one or more of its vehicle control systems (e.g., propulsion, throttle, steering, brakes, etc.) which is confined to some time interval. Trajectories are generated and selected by the vehicle's motion planning systems. The vehicle may routinely generate and select trajectories to carry out its motion as it drives along the roadway 118. Trajectories may be generated, for example, based on necessary or desirable motions of the vehicle (e.g., stop at a stop sign, accelerate to pass another vehicle, etc.) Candidate trajectories can be generated and selected based on information developed from external sensors and/or generated and selected based on vehicle characteristics, such as, for example, maximum speed, acceleration, steering, and steering rate. Sensor based candidate trajectories, for example, may integrate the perception of the environment (e.g., based on input from the camera system 104, the LiDAR system 106, etc.). Vehicle-dynamics based candidate trajectories and model based optimization methods for trajectory generation (e.g., gradient descent-based methods, model predictive control, etc.) may account for the particular aspects of vehicle motion and constraints thereon (e.g., maximum speed, turning radius, etc.). These aspects and constraints can be stored, for example, in one or more modules on the autonomy system 200 (e.g., a memory module). The motions and constraints of the vehicle 102 itself may themselves be dynamic (e.g., the vehicle's maximum turn radius may decrease with increasing speed). Additionally, feasibility must be accounted for when generating and selecting trajectories.

Figure 2:
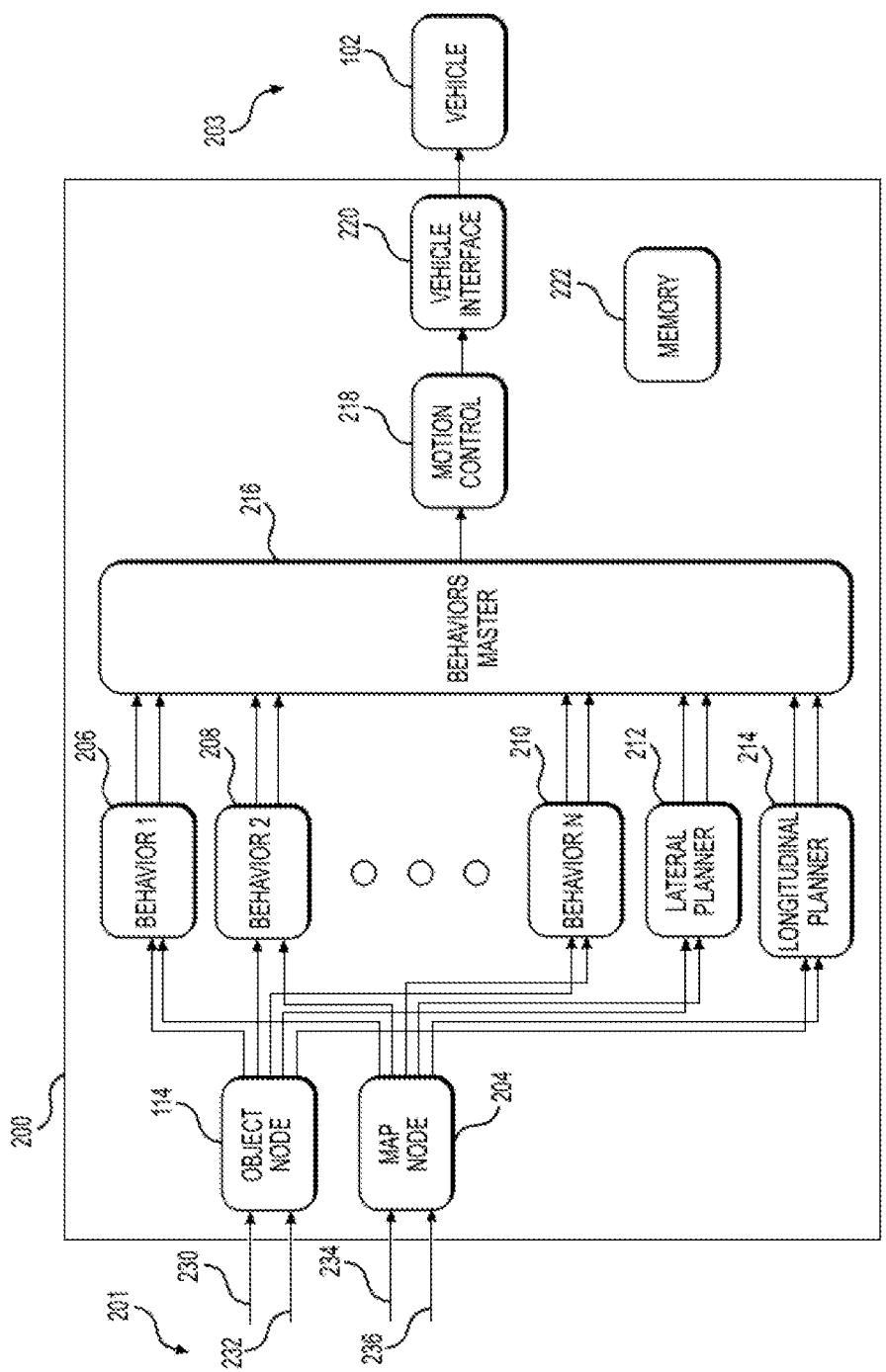
FIG. 2 shows components of an autonomy system of an automated vehicle, according to an embodiment.

Still referring to FIG. 1, the controller 200, which is described in greater detail herein, especially with respect to FIG. 2, is configured to receive an input(s) from and provide an output(s) to various other systems or components of the system 100. For example, the autonomy system 200 may receive visual system data from the camera system 104, LiDAR system data from the LiDAR system 106, GNSS data from the GNSS 108, external system data from the transceiver 112, and IMU system data from the IMU 110.

The camera system 104 may be configured to capture images of the environment surrounding the vehicle 102 in any aspect or field of view (FOV). The FOV can have any angle or aspect such that images of the areas ahead of, to the side, and behind the vehicle 102 may be captured. In some embodiments, the FOV may be limited to particular areas around the vehicle 102 (e.g., forward of the vehicle 102, to the sides of the vehicle 102, etc.) or may surround 360 degrees of the vehicle 102. In some embodiments, the vehicle 102 includes multiple cameras and the images from each of the multiple cameras may be stitched to generate a visual representation of the multiple cameras' fields of view, which may be used to, for example, generate a bird's eye view of the environment surrounding the vehicle 102 (similar to that depicted in FIG. 1). In some embodiments, the image data generated by the camera system(s) 104 may be sent to the autonomy system 200 and/or other aspects of the system 100 and this image data may include the vehicle 102 or a generated representation of the vehicle 102. In some embodiments, one or more systems or components of the system 100 may overlay labels to the features depicted in the image data, such as on a raster layer or other semantic layer of an HD map.

The LiDAR system 106 generally includes a laser generator and a detector and can send and receive a LiDAR signal. The LiDAR signal can be emitted and received from any direction such that LiDAR point clouds (or "LiDAR images") of the areas ahead of, to the side, and behind the vehicle 102 can be captured and represented in the LiDAR point clouds. In some embodiments, the vehicle 102 includes multiple LiDAR lasers and sensors and the LiDAR point clouds from each of the multiple LiDAR sensors may be stitched to generate a LiDAR-based representation of the area covered by the LiDAR signal(s). In some embodiments, the LiDAR point cloud(s) generated by the LiDAR sensors and sent to the autonomy system 200 and other aspects of the system 100 may include the vehicle 102. In some embodiments, the system inputs from the camera system 104 and the LiDAR system 106 may be fused.

The GNSS 108 may be positioned on the vehicle 102 and may be configured to determine a location of the vehicle 102, which it may embody as GNSS data (described herein with respect to FIG. 3). The GNSS 108 may be configured to receive one or more signals from a global navigation satellite system (GNSS) (e.g., GPS system) to localize the vehicle 102 via geolocation. In some embodiments, the GNSS 108 may provide an input to or be configured to interact with, update, or otherwise utilize one or more digital maps, such as an HD map (e.g., in a raster layer or other semantic map). In some embodiments, the GNSS 108 is configured to receive updates from the external network (e.g., via a GNSS/GPS receiver (not depicted), the transceiver 112, etc.). The updates may include one or more of position data, speed/direction data, traffic data, weather data, or other types of data about the vehicle 102 and its environment.

The transceiver 112 may be configured to communicate with an external network via, for example, a wired and/or wireless connection. In embodiments, comprising a wireless connection the connection may be a wireless communication signal (e.g., Wi-Fi, cellular, LTE, 5g. etc.). However, in some embodiments, the transceiver 112 may be configured to communicate with an external network via a wired connection, such as, for example, during testing or initial installation of the system 100 to the vehicle 102. The connection(s) may be used to download and install various lines of code in the form of digital files (e.g., HD maps), executable programs (e.g., navigation programs), and other computer-readable code that may be used by the system 100 to navigate the vehicle 102 or otherwise operate the vehicle 102, either autonomously or semi-autonomously. The digital files, executable programs, and other computer readable code may be stored locally or remotely and may be routinely updated (e.g., automatically or manually) via the transceiver 112 or updated on demand. In some embodiments, the vehicle 102 may deploy with all of the data it needs to complete a mission (e.g., perception, localization, and mission planning) and may not utilize a wireless connection or other connection while underway.

The IMU 110 may be an electronic device that measures and reports one or more features regarding the motion of the vehicle 102. For example, the IMU 110 may measure a velocity, acceleration, angular rate, and or an orientation of the vehicle 102 or one or more of its individual components using a combination of accelerometers, gyroscopes, and/or magnetometers. The IMU 110 may detect linear acceleration using one or more accelerometers and rotational rate using one or more gyroscopes. In some embodiments, the IMU 110 may be communicatively coupled to one or more other systems, for example, the GNSS 108 and may provide an input to and receive an output from the GNSS 108, which may allow the GNSS 108 to continue to predict a location of the vehicle 102 even when the GNSS 108 cannot receive satellite signals.

FIG. 2 shows components of an autonomy system 200 of an automated vehicle, according to an embodiment. The autonomy system 200 may receive inputs 201 and generate outputs 203. The autonomy system 200 may include an object node 202, a map mode 204, a series of behavioral modules including a first behavior module 206, a second behavior module 208, and an nth behavior module 210, a lateral planner 212, a longitudinal planner 214, a behaviors master module 216, a motion control module 218, and a vehicle interface module 220 for interfacing with the vehicle 102 of FIG. 1. The autonomy system 200 may also include a memory 222. The autonomy system 200 may receive, for example, camera system data 230 from the camera system 104, LiDAR system data 232 from the LiDAR system 106, GNSS data 234 from the GNSS 108, and IMU system data 236 from the IMU 110. In some embodiments, the autonomy system 200 and one or more of its components may receive external system data from the transceiver 112.

The autonomy system 200 may comprise a data processor, a microcontroller, a microprocessor, a digital signal processor, a logic circuit, a programmable logic array, or one or more other devices for controlling the system 100 in response to one or more of the inputs 201. The autonomy system 200 may embody a single microprocessor or multiple microprocessors that may include means for trajectory generation. For example, the autonomy system 200 may include a memory, a secondary storage device, and a processor, such as a central processing unit or any other means for accomplishing a task consistent with the present disclosure. The memory or secondary storage device associated with autonomy system 200 may store data and/or software routines that may assist the autonomy system 200 in performing its functions, such as the functions of the method 300 described herein with respect to FIG. 3. Further, the memory or secondary storage device associated with the autonomy system 200 may also store data received from various inputs associated with the system 100. Numerous commercially available microprocessors can be configured to perform the functions of the controller 200. It should be appreciated that autonomy system 200 could readily embody a general machine controller capable of controlling numerous other machine functions. Alternatively, a special-purpose machine controller could be provided. Further, the controller 200, or portions thereof, may be located remote from the system 100. Various other known circuits may be associated with the controller 200, including signal-conditioning circuitry, communication circuitry, hydraulic or other actuation circuitry, and other appropriate circuitry.

The memory 222 may store software-based components to perform various processes and techniques described herein of the controller 200, including the various behavior modules, the lateral planner, and the longitudinal planner. The memory 222 may store one or more machine readable and executable software instructions, software code, or executable computer programs, which may be executed by a processor of the controller 200. The software instructions may be further embodied in one or more routines, subroutines, or modules and may utilize various auxiliary libraries and input/output functions to communicate with other equipment, modules, or aspects of the system 100.

As mentioned above, the autonomy system 200 may include various behavior planning modules (which may be stored, for example, in the memory 222), such as, for example, the first behavior module 206, the second behavior module 208, and the nth behavior module 210 (collectively referred to as "the behavior modules"). The behavior modules may handle planning for (e.g., planning to take one or more actions) various aspects of the environment surrounding the vehicle 102. The behavior modules may do so, for example, based on static and dynamic objects (e.g., traffic, speed bumps, road signs, cyclists, etc.), traffic control features (e.g., road signs, road signals, lane markings, etc.), and other aspects of the environment. The behavioral planning modules may output, for example, controller directives such as lateral and longitudinal driving bias, aggressiveness of distance keeping from various obstacles or other traffic, maximum and minimum speed, maximum and minimum acceleration, etc. The behaviors modules may receive data from one or more of a perception engine, a localization system, and other components of the behaviors planning and control system. For example, the behaviors modules may receive image data captured by one or more the camera system 104 or the LiDAR system 106, which may have been processed or filtered by one or more other components of the system 100. The behaviors modules can use image processing techniques or other object identification techniques to identify static (e.g., stationary) and/or dynamic (e.g., moving) objects in the area around (e.g., surrounding and/or in view by the data capturing system or systems of camera system 104 or the LiDAR system 106) the vehicle. In doing so, the behaviors modules can identify that the objects exist, the proximity (e.g., the distance of the objects from the vehicle 102, and/or what the objects are (e.g., the types of the objects). In some embodiments, the behavior planning modules may receive localization data from components which localize the vehicle 102 (i.e., determine its own location), which data may be processed and/or filtered, and may use localization data to calculate one or more trajectories based on the present location of the vehicle. The localization data may include, for example, a location (e.g., absolute (lat/long) or relative with respect to one or more external objects/features as determined from a digital map (e.g., HD map)). The behavioral planning modules may generate space constraints for viable trajectories and the lateral and longitudinal planners may generate trajectories within those constraints for implementation by the vehicle 102 as described in greater detail herein.

The lateral planner 212 and the longitudinal planner 214 (collectively "planning modules") may plan lateral motion and longitudinal motion, respectively, as a desired trajectory of the vehicle 102. The desired trajectory may include, for example, both a desired path and speed. The planning modules may consider kinematic static and dynamic constraints of the vehicle, as well as all moving and static obstacles. The planning modules may consider, for example, inputs from the various behavioral modules described herein when considering kinematic, static, and dynamic constraints. The planning modules may plan motion of the vehicle over any planning horizon. The planning modules may concatenate multiple layers of trajectories to produce a plan with one or more near to distant planning horizons and search for multiple candidate trajectories within the constraints provided by the behavioral modules, for instance. The planning modules may interact with one another and the other various modules of the system in a hierarchical architecture or a parallel architecture and may comprise one or more dedicated sensors.

The behaviors master module 216 may be an aggregator of signals and information from the various behavior modules (1-n) and may receive and send signals between the various behaviors modules and the lateral planner 212 and the longitudinal planner 214. Through the behaviors master module 216, all of the behaviors modules and the lateral planner 212 and the longitudinal planner 214 can communicate with one another.

The motion control module 218 may generate and send motion control signals to the vehicle interface module 220. The vehicle interface module 220 may, for example, send one or more signals to the various aspects of the automated vehicle that actually control the motion of the vehicle (e.g., engine, throttle, steering wheel, brakes, etc.)

Figure 3A:
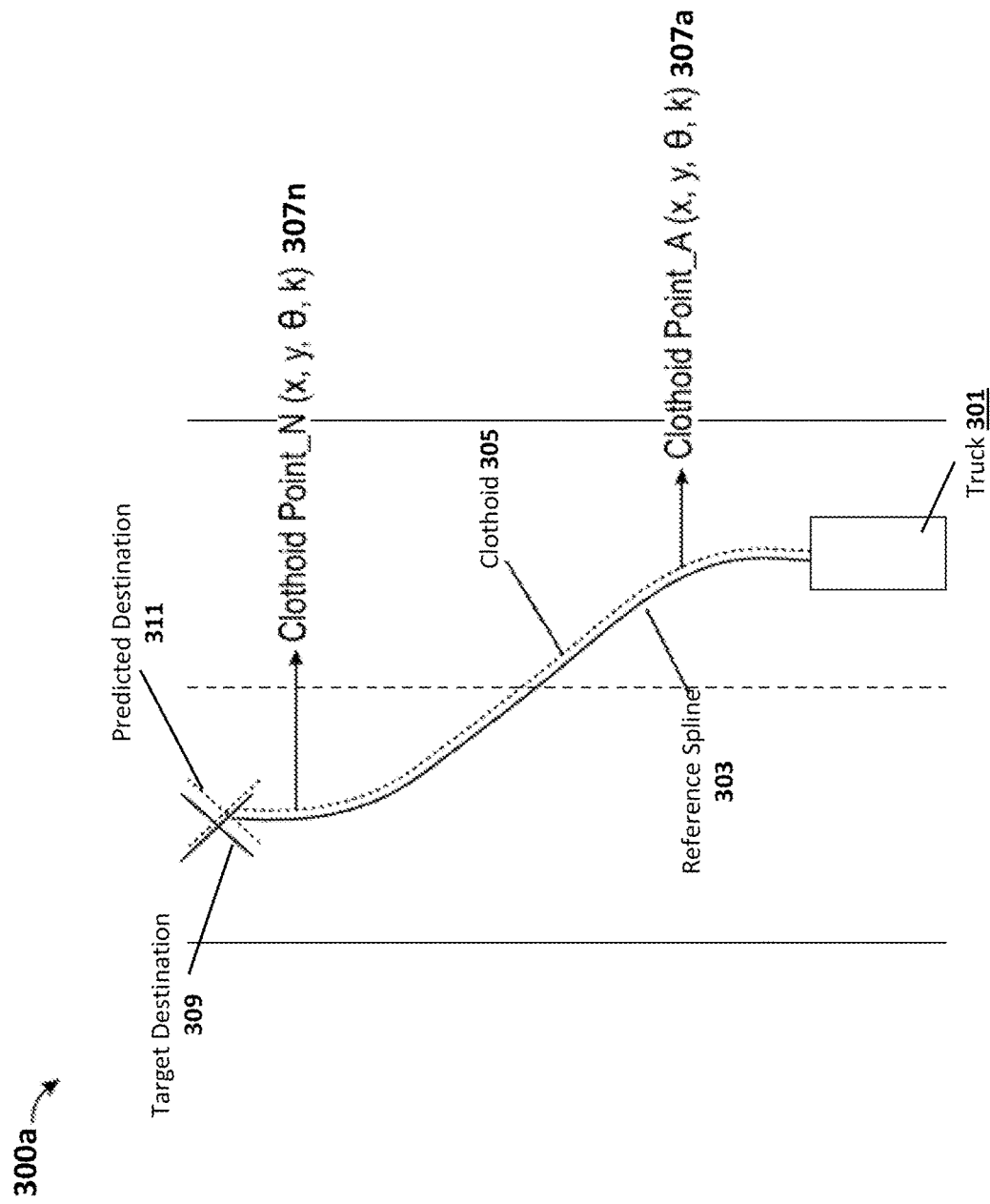
FIG. 3A shows a top view of a straight segment of road, where an automated vehicle is traveling, and generates reference trajectories and clothoids defining a travel path when performing a lane change maneuver to a target lane, according to an embodiment.

FIG. 3A shows a top view of a straight segment of road 300a in which an automated vehicle (shown as a truck 301) is traveling and generates reference trajectories (or reference splines 303) and clothoids for defining a driving path when performing a lane change maneuver to a target lane, according to an embodiment.

The autonomy system of the truck 301 continually generates proposed trajectories for performing a lane change maneuver within the context of the shape of the road 300a. The autonomy system uses perception sensor data and map data to determine and track the shape of the road 300a for a given distance ahead of the truck 301. The autonomy system continually determines a target destination 309 in the target lane at a target distance located at a time or distance parameter for completing the lane change. For example, the autonomy system is programmed with an assumption that the lane change takes seven seconds to execute, so the autonomy system continually determines target destinations 309 at target distances that are seven seconds from the current positon of the truck 301. Contemporaneously, the autonomy system continually generates reference splines 303 defining potential travel paths for the truck 301 to follow from the current position to the target location 309 in the target traffic lane.

After generating a particular reference spline 303, the autonomy system generates any number of discrete clothoid points 307a-307n (generally referred to as clothoid points 307 or a clothoid point 307) along the continuous reference spline 303. The series of clothoid points 307 define a clothoid 305 approximating a corrected or predicted path (relative to the reference spline 303) to a corrected or predicted destination 311 (relative to the target destination 309).

Each discrete clothoid point 307 is defined by a latitudinal position (X) within a threshold distance from the reference spline; a longitudinal position (Y); an instantaneous heading (θ) relative to a next clothoid point 307; and a curvature (k) relative to the next clothoid point 307. The autonomy system forward-propagates the headings and curvatures to generate the series of clothoid points 307. When generating each subsequent clothoid point 307, the autonomy system updates and applies the values for the latitudinal position (X), longitudinal position (Y), instantaneous heading (θ), and curvature (k).

The autonomy system generates each clothoid point 307 according to certain preconfigured bound parameters. As an example, the clothoid points 307 are generated at a preconfigured interval distance (i) along the reference spline 303. For instance, a first clothoid point 307a generated at a first longitude ($Y_a$) and a second clothoid point 307b is generated at a second longitude at the given interval distance (e.g., $Y_b=Y_a+i$). As another example, each clothoid point 307 must be generated with a latitudinal position within a preconfigured threshold distance from the reference spline 303. Similarly, the clothoid points 307 may be generated with headings and/or curvatures satisfying corresponding thresholds.

As the autonomy system generates the points 307 of the clothoid 305 along the spline 303 to the target destination 309, the autonomy system may ultimately generate a predicted destination 311 offset from the target destination 309. This difference could result from calculating each respective clothoid point 307 with respect to the preconfigured clothoid thresholds. The truck 301 follows the path defined by the clothoid 305, only when each clothoid point 307 can be generated in a manner that satisfies each of the clothoid thresholds. Moreover, the truck 301 follows the path defined by the clothoid 305, only if the clothoid 305 and the predicted destination 311 would keep the truck 301 within the boundaries of the road and the target lane.

Figure 3B:
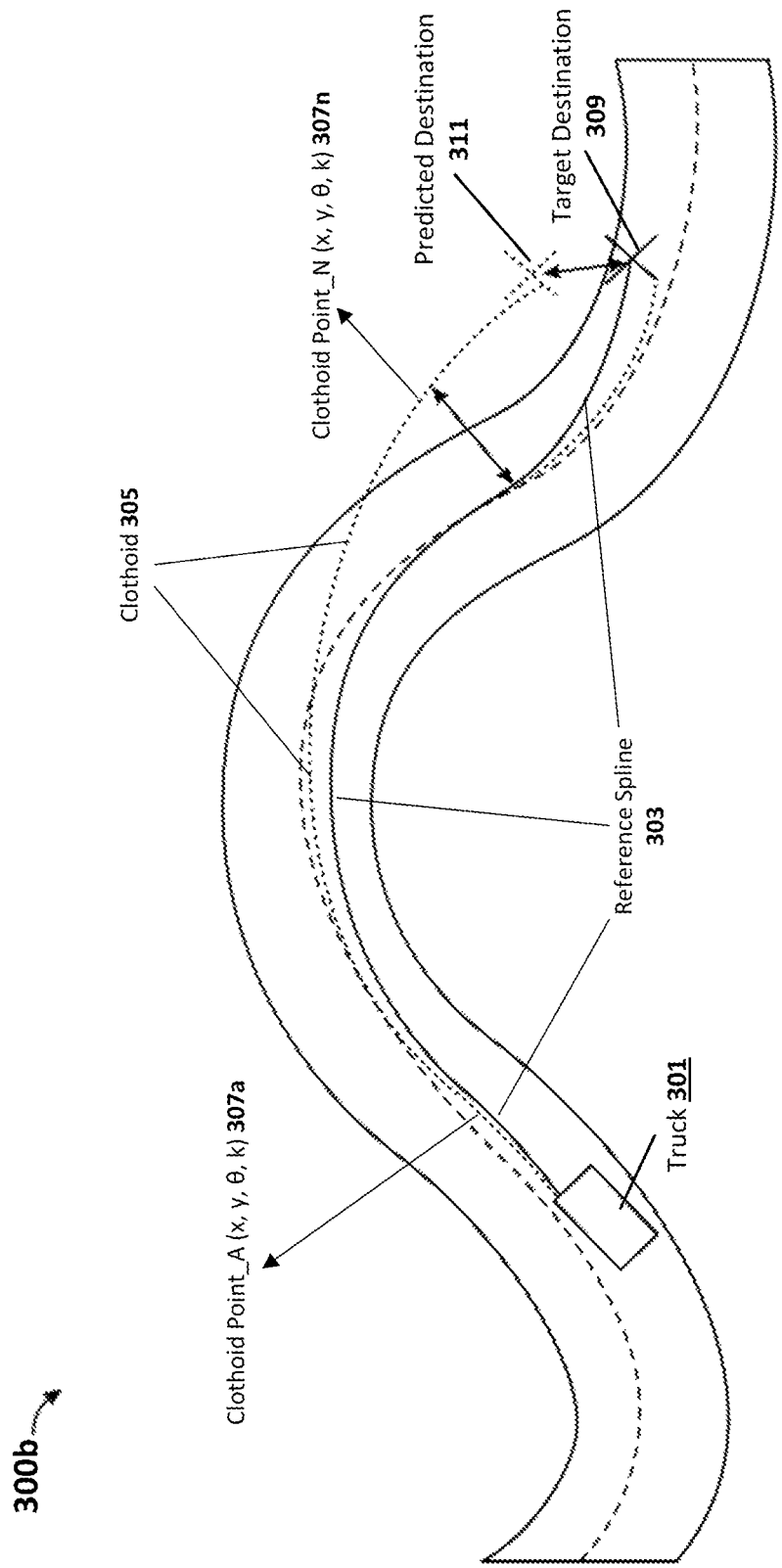
FIG. 3B shows a top view of a road a serpentine shape or s-curve, where an automated vehicle is traveling, and generates reference trajectories and clothoids defining a travel path when performing a lane change maneuver to a target lane, according to an embodiment.

FIG. 3B shows a top view of a road 300b having serpentine shape or s-curve, where the truck 301 (or other type of automated ego vehicle) is traveling and generates reference trajectories (or reference splines 303) and clothoids for defining a driving path to follow when performing a lane change maneuver to a target lane, according to an embodiment.

The autonomy system of the truck 301 continually generates proposed trajectories for performing the lane change maneuver within the context of the shape of the road 300b. The autonomy system uses perception sensor data and map data to determine and track the shape of the road 300b for a given distance ahead of the truck 301. The autonomy system continually determines the target destination 309 in the target lane at a target distance located at a time or distance parameter for completing the lane change. For example, the autonomy system is programmed with an assumption that the lane change takes seven seconds to execute, so the autonomy system continually determines target destinations 309 at target distances that are seven seconds from the current positon of the truck 301. Contemporaneously, the autonomy system continually generates the reference splines 303 defining potential travel paths for the truck 301 to follow from the current position to the target location 309 in the target lane.

After generating a particular reference spline 303, the autonomy system generates any number of discrete clothoid points 307 along the continuous reference spline 303. The series of clothoid points 307 define a clothoid 305 approximating a corrected or predicted path (relative to the reference spline 303) to a corrected or predicted destination 311 (relative to the target destination 309).

Each discrete clothoid point 307 is defined by a latitudinal position (X) within a threshold distance from the reference spline 303; a longitudinal position (Y); an instantaneous heading (θ) relative to a next clothoid point 307; and a curvature (k) relative to the next clothoid point 307. The autonomy system forward-propagates the headings and curvatures to generate the series of clothoid points 307. When generating each subsequent clothoid point 307, the autonomy system updates and applies the values for the latitudinal position (X), longitudinal position (Y), instantaneous heading (θ), and curvature (k).

The autonomy system generates each clothoid point 307 according to certain preconfigured bounding parameters. As an example, the clothoid points 307 are generated at a preconfigured interval distance (i) along the reference spline 303. For instance, a first clothoid point 307a is generated at a first longitude ($Y_a$) and a second clothoid point 307b is generated at a second longitude ($Y_b$) at the given interval distance (e.g., $Y_b = Y_a + i$). As another example, each clothoid point 307 must be generated with a latitudinal position within a preconfigured threshold distance from the reference spline 303. Similarly, the clothoid points 307 may be generated with headings and/or curvatures satisfying corresponding thresholds.

As the autonomy system generates the points 307 of the clothoid 305 along the reference spline 303 to the target destination 309, the autonomy system may ultimately generate a predicted destination 311 offset from the target destination 309. This difference between the predicted destination 311 and the target destination 309 could result from calculating each respective clothoid point 307 with respect to the preconfigured clothoid thresholds. The truck 301 follows the path defined by the clothoid 305, only when each clothoid point 307 can be generated in a manner that satisfies each of the clothoid thresholds. Moreover, the truck 301 follows the path defined by the clothoid 305, only if the clothoid 305 and the predicted destination 311 would keep the truck 301 within the boundaries of the road and the target lane.

In the example of FIG. 3B, the autonomy system generates clothoid points 307 according to the threshold headings and curvatures, but ultimately fails to generate a clothoid points 307 within the threshold distance from the reference spline 303. In this way, the clothoid points function as a means of confirming a desired reference spline 303 would not jeopardize the safety of the truck 301 by selecting a driving path that would cause a hazardous amount of lateral acceleration. For instance, if the truck 301 attempted to follow the reference spline using clothoid points 307 within the threshold distance, then the combination of following the contours of the serpentine and the lane change maneuver would cause an amount of lateral acceleration. In some implementations, this would be represented by curvatures and headings that exceed corresponding thresholds. Conversely, as depicted in FIG. 3B, by avoiding undue lateral acceleration, the autonomy system determines that the clothoid 305 would eventually exceed a threshold distance from the reference spline 303, causing the truck 301 to perform an unsafe lane change or depart from the road altogether. If the autonomy system determines that the truck 301 cannot generate a satisfactory clothoid 305, then the autonomy system discards the current candidate reference spline 303 and generates a new candidate reference spline 303.

Figure 4:
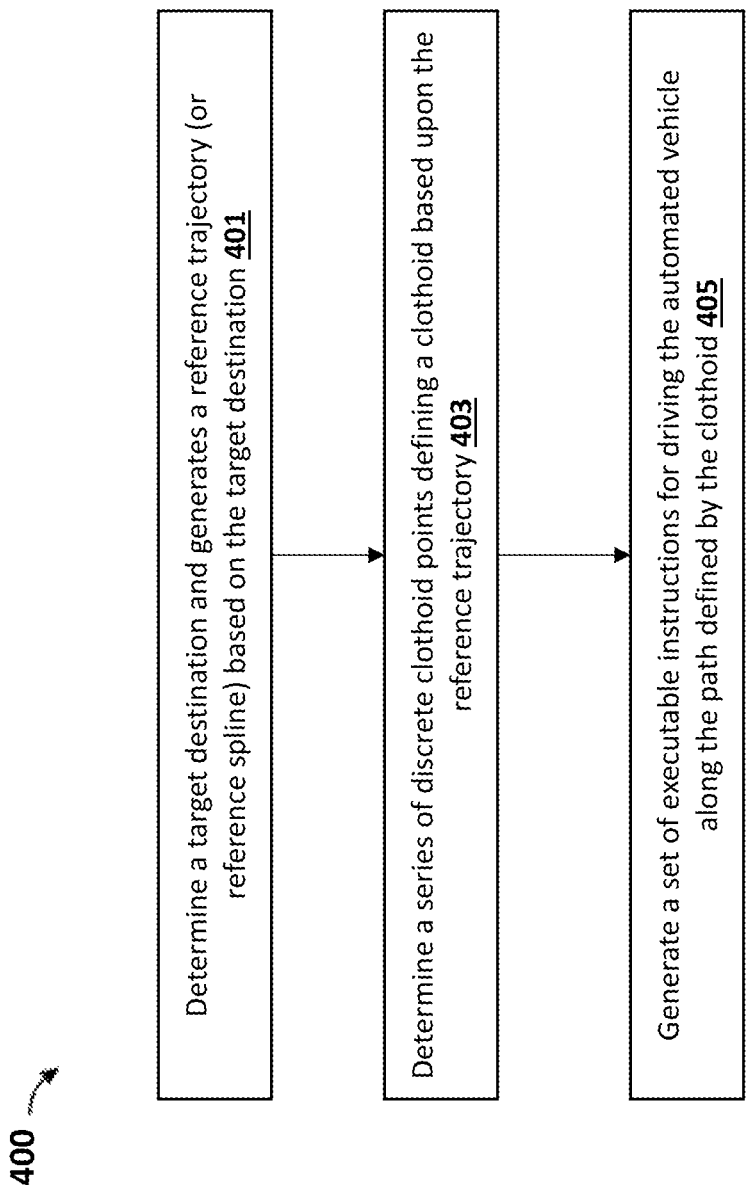
FIG. 4 shows operational steps of a method for generating a reference trajectory and clothoid for determine and following a path for an automated vehicle to perform a lane change maneuver.

FIG. 4 shows operational steps of a method 400 for generating a reference trajectory and clothoid for determine and following a path for an automated vehicle to perform a lane change maneuver.

In operation 401, an autonomy system continually determines a target destination and generates a reference trajectory (or reference spline) based on the target destination. The reference spline may be defined by a continuous series of curvatures that the ego vehicle follows as a driving path for the duration of the lane change maneuver (from an instant location to the target destination). The autonomy system determines the target destination at a target distance from the ego vehicle based upon, for example, upon a target distance parameter. The autonomy system receives and references perception sensor data and/or map data indicating the geometry of the road, which includes the curvature of the road and the outer boundaries of the road. Accordingly, the autonomy system determines the target destination for the lane change maneuver based upon the target distance from the ego vehicle and the geometry of the road.

As an example, the autonomy system uses a quintic hermite spline function to generate continuous curvatures to be followed by the ego through the duration of the lane change, thereby forming the reference trajectory. The lateral position is described with reference to a center of a target lane for the lane change maneuver, and the reference frame for a longitudinal position initialized at a current location of the ego vehicle on the road. The starting condition for the reference trajectory represents a set of values at a current location of the ego on road, including a longitudinal position, lateral position, a first derivative representing heading, and a second derivative representing curvature. The start conditions are defined as representing longitudinal position (0.0 since our reference is current ego position), lateral position with respect to target lane, first derivative of lateral position with respect to longitudinal position and the second derivative of lateral position with respect to longitudinal position. The end conditions is also represented in the same fashion with the longitudinal position representing the length of the lane change and the lateral position as 0.0 since we want to be exactly on top of our target lane at the end of a lane change and defining the first and second derivatives which are also 0.0 in our case since we want to be following the target lane at the end of the maneuver. The output of the quintic hermite spline is set of reference headings and curvatures and can be sampled at various longitudinal distances from the start to the end of a lane change. The curvatures generated are guaranteed to be continuous since the degree of the spline is greater than three.

In operation 403, the autonomy system determines a series of discrete clothoid points defining a clothoid. The output of the spline function (e.g., quintic hermite spline) includes a set of reference headings and continuous curvatures. When generating the clothoid points, the autonomy system samples the headings and curvatures at various discrete longitudinal distances from the start (along the reference spline) to the end of the reference spline (at the target destination for completing the lane change). At each clothid point of the clothoid, the autonomy system iteratively or recursively generates a set of values defining each next clothoid, from a starting position to an end position. The set of values includes defining each clothiod point include the longitudinal position, latitudinal position, the heading, and curvature. In operation 405, the autonomy system generates a set of executable instructions for driving the automated vehicle along the path defined by the clothoid.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
   generating, via a behaviors master module executable by a processor of an automated vehicle, a reference trajectory for the automated vehicle according to a target destination, the reference trajectory including one or more reference headings and one or more curvatures;
   determining, via the behaviors master module, a clothoid for the reference trajectory based upon a curvature rate and a current curvature of the automated vehicle, the clothoid comprising a plurality of discrete clothoid points, each discrete clothoid point situated within a threshold distance from the reference trajectory, wherein determining the clothoid further comprises:
generating the plurality of discrete clothoid points at a preconfigured interval distance along the reference trajectory;
generating, via the behaviors master module, a path defined by the clothoid; and
generating, via a motion control module executable by the processor, a driving instruction for directing the automated vehicle to travel along the path.

2. The method according to claim 1, wherein the reference trajectory is generated according to a quintic hermite spline algorithm.

3. The method according to claim 1, wherein generating a driving instruction includes:
canceling, by the processor, a lane change maneuver associated with the reference trajectory; and
generating, by the processor, a next reference trajectory according to a next target destination.

4. The method according to claim 3, further comprising determining, by the processor, that a clothoid point exceeds the threshold distance from the reference trajectory, wherein the processor cancels the lane change maneuver when the clothoid point exceeds the threshold distance.

5. The method according to claim 1, wherein the processor iteratively and recursively generates each clothoid point of the clothoid.

6. The method according to claim 1, wherein each clothoid point is defined by a set of clothoid values, including a longitudinal position, a lateral position, a heading, and a curvature.

7. The method according to claim 6, wherein the processor generates the set of clothoid values of each particular clothoid point according to reference values of corresponding points of the reference trajectory.

8. The method according to claim 1, wherein determining the clothoid further comprises:
generating the each discrete clothoid point with a latitudinal position within the threshold distance from the reference trajectory; and
generating the plurality of discrete clothoid points at a preconfigured longitudinal interval distance along the reference trajectory.

9. A system comprising:
a non-transitory computer-readable medium containing instructions that when executed by at least one processor associated with an automated vehicle are configured to:
generate, via a behaviors master module executable by the at least one processor, a reference trajectory for the automated vehicle according to a target destination, the reference trajectory including one or more reference headings and one or more curvatures;
determine, via the behaviors master module, a clothoid for the reference trajectory based upon a curvature rate and a current curvature of the automated vehicle, the clothoid comprising a plurality of discrete clothoid points, each discrete clothoid point situated within a threshold distance from the reference trajectory, wherein determine the clothoid further comprises:
generate the plurality of discrete clothoid points at a preconfigured interval distance along the reference trajectory;
generate, via the behaviors master module, a path defined by the clothoid; and
generate, via a motion control module executable by the at least one processor, a driving instruction for directing the automated vehicle to travel along the path.

10. The system according to claim 9, wherein the reference trajectory is generated according to a quintic hermite spline algorithm.

11. The system according to claim 9, wherein the at least one processor is further configured to:
cancel a lane change maneuver associated with the reference trajectory; and
generate a next reference trajectory according to a next target destination.

12. The system according to claim 11, wherein the at least one processor is further configured to determine that a clothoid point exceeds the threshold distance from the reference trajectory, wherein the processor cancels the lane change maneuver when the clothoid point exceeds the threshold distance.

13. The system according to claim 9, wherein the at least one processor is configured to iteratively and recursively generate each clothoid point of the clothoid.

14. The system according to claim 9, wherein each clothoid point is defined by a set of clothoid values, including a longitudinal position, a lateral position, a heading, and a curvature.

15. The system according to claim 14, wherein the at least one processor is configured to generate the set of clothoid values of each particular clothoid point according to reference values of corresponding points of the reference trajectory.

16. A system comprising:
a computer associated with an automated vehicle and comprising at least one processor configured to:
generate, via a behaviors master module executable by the at least one processor, a reference trajectory for the automated vehicle according to a target destination, the reference trajectory including one or more reference headings and one or more curvatures;
determine, via the behaviors master module, a clothoid for the reference trajectory based upon a curvature rate and a current curvature of the automated vehicle, the clothoid comprising a plurality of discrete clothoid points, each discrete clothoid point situated within a threshold distance from the reference trajectory, wherein determine the clothoid further comprises:
generate the plurality of discrete clothoid points at a preconfigured interval distance along the reference trajectory;
generate, via the behaviors master module, a path defined by the clothoid; and
generate, via a motion control module executable by the at least one processor, a driving instruction for directing the automated vehicle to travel along the path.

17. The system according to claim 16, wherein the reference trajectory is generated according to a quintic hermite spline algorithm.

18. The system according to claim 16, wherein the at least one processor is configured to iteratively and recursively generate each clothoid point of the clothoid.

19. The system according to claim 16, wherein each clothoid point is defined by a set of clothoid values, including a longitudinal position, a lateral position, a heading, and a curvature.

20. The system according to claim 16, wherein the at least one processor is configured to generate the set of clothoid values of each particular clothoid point according to reference values of corresponding points of the reference trajectory.

* * * * *